(12) United States Patent
Hood

(10) Patent No.: US 10,177,707 B2
(45) Date of Patent: Jan. 8, 2019

(54) PV PANEL WIRE COVER ASSEMBLY

(71) Applicant: David C. Hood, Lincoln, CA (US)

(72) Inventor: David C. Hood, Lincoln, CA (US)

( * ) Notice: Subject to any disclaimer, the term of this patent is extended or adjusted under 35 U.S.C. 154(b) by 16 days.

(21) Appl. No.: 15/622,849

(22) Filed: Jun. 14, 2017

(65) Prior Publication Data

US 2018/0131319 A1 May 10, 2018

Related U.S. Application Data

(63) Continuation-in-part of application No. 15/488,275, filed on Apr. 14, 2017.

(60) Provisional application No. 62/351,784, filed on Jun. 17, 2016.

(51) Int. Cl.
| | |
|---|---|
| *H02S 40/34* | (2014.01) |
| *H02G 3/04* | (2006.01) |
| *H02S 30/00* | (2014.01) |
| *H02G 3/06* | (2006.01) |
| *H02G 3/34* | (2006.01) |

(52) U.S. Cl.
CPC ........... *H02S 40/34* (2014.12); *H02G 3/04* (2013.01); *H02G 3/0431* (2013.01); *H02S 30/00* (2013.01); *H02G 3/0608* (2013.01); *H02G 3/0616* (2013.01); *H02G 3/34* (2013.01)

(58) Field of Classification Search
CPC ........... H02S 40/34; H02S 30/00; H02G 3/04; H02G 3/0431; H02G 3/0608; H02G 3/0616; H02G 3/34
See application file for complete search history.

(56) References Cited

U.S. PATENT DOCUMENTS

| | | | |
|---|---|---|---|
| 4,433,200 | A | 2/1984 | Jester et al. |
| 5,164,020 | A | 11/1992 | Wagner et al. |
| 2003/0070368 | A1 | 4/2003 | Shingleton |
| 2011/0265860 | A1 | 11/2011 | Ciasulli et al. |
| 2011/0303262 | A1 | 12/2011 | Wolter |
| 2012/0192925 | A1 | 8/2012 | Grushkowitz et al. |

(Continued)

FOREIGN PATENT DOCUMENTS

| | | |
|---|---|---|
| JP | 2015158101 A | 9/2015 |
| KR | 101562850 B1 | 10/2015 |

OTHER PUBLICATIONS

U.S. Appl No. 15/488,275—Office Action dated Oct. 18, 2017, 28 pages.

(Continued)

*Primary Examiner* — Michael C Miggins
(74) *Attorney, Agent, or Firm* — Haynes Beffel & Wolfeld LLP; James F. Hann; Andrew L. Dunlap

(57) ABSTRACT

A PV panel wire cover assembly includes an elongate wire cover and a plate coupler, the assembly used with a PV panel having perimeter trim with a leg spaced apart from the PV panel to define a gap therebetween. The leg of the perimeter trim has a perimeter trim thickness. The wire cover has first and second opposite sides and a first flange extending from the first side with a slot formed therein. The plate coupler includes a fastener and a plate having proximal portion and a distal portion, the distal portion sized for receipt within the gap. The fastener passes through the slot and has first and second portions engaging the first flange and the proximal portion of the plate respectively. The wire cover can be fastened to the perimeter trim of the PV panel through the plate coupler without penetrating the PV panel.

7 Claims, 14 Drawing Sheets

(56) References Cited

U.S. PATENT DOCUMENTS

| | | |
|---|---|---|
| 2014/0048498 A1 | 2/2014 | Kuan |
| 2014/0137927 A1 | 5/2014 | Kim et al. |
| 2014/0246077 A1 | 9/2014 | Poulakis |
| 2016/0268965 A1 | 9/2016 | Stearns et al. |

OTHER PUBLICATIONS

PCT/US/2017/027782—International Search Report and Written Opinion dated Sep. 20, 2017, 10 pages.
U.S. Appl. No. 15/488,275—Non-Provisional Application filed Apr. 14, 2017, 48 pages.
U.S. Appl. No. 29/607,437—Design Patent Application filed Jun. 13, 2017, 4 pages.
U.S. Appl. No. 29/607,440—Design Application filed Jun. 13, 2017, 4 pages.
U.S. Appl. No. 29/607,442—Design Application filed Jun. 13, 2017, 3 pages.
U.S. Appl. No. 29/607,445—Design Application filed Jun. 13, 2017, 3 pages.
U.S. Appl. No. 15/622,882—Non-Provisional Application filed Jun. 14, 2017, 29 pages.
U.S. Appl. No. 15/634,323—Non-Provisional Application filed Jun. 27, 2017, 18 pages.
U.S. Appl. No. 15/488,275—Response to Office Action dated Oct. 18, 2017, filed Nov. 16, 2017, 18 pages.

PV PANEL WIRE COVER ASSEMBLY

CROSS-REFERENCE TO OTHER APPLICATIONS

This application claims the benefit of U.S. provisional patent application No. 62/351,784, filed 17 Jun. 2016 and entitled Sliding Clip for Solar Panel Cover, and is a continuation in part of U.S. patent application Ser. No. 15/488,275, filed 14 Apr. 2017 and entitled Wire Cover and Mounting Bracket, the disclosures of which are incorporated by reference.

BACKGROUND OF THE INVENTION

Solar photovoltaic (PV) panels are typically provided of rigid planar form with each panel having a similar size, typically rectangular and approximately two to three feet in a shorter dimension and four to six feet in a longer dimension. Solar cells are provided upon a front surface of the solar panel. These individual cells are electrically connected together. A junction box is provided on a rear surface of each panel which gathers up the electric power generated by the cells on the panel and passes this electric power onto wires. These wires from the junction box can facilitate wiring together of multiple panels of an array to produce the overall power generated by the array of panels.

Solar panels are required to be deployed in an outside environment exposed to solar radiation, where the panels are also exposed to extremes of temperature and moisture. Furthermore, birds and other animals typically have access to the panels and the wiring connecting the panels together. One of the significant benefits of solar power systems of the PV panel variety is that they have no moving parts which must require maintenance or periodic inspection/replacement, as is the case with other distributed power assets such as wind turbines. However, the outside exposure experienced by the panel and its associated wires can result in damage occurring to the panels even without the panels experiencing any motion. Some solar panel arrays are mounted in a movable fashion to "track" the sun. Such tracking systems can be kept quite simple and easy to maintain, so that the panels do not require significant maintenance or inspection for reliable operation.

Perhaps the greatest source of PV panel array failure is presented in association with the wires that connect the individual panels together. The wires have connectors where they are joined to other segments of wire or to the junction boxes of various panels. If the wires become damaged, the system of PV panels can fail. The wires also benefit from minimizing expense through only providing an amount of exterior insulation necessary and to otherwise structure the wire with a relatively light and low cost configuration, including diameter, conductive material, insulating material, insulating material thickness, etc. Furthermore, the wires themselves can be extensive in length and represent a significant value for the overall panel system. It is known in certain instances for thieves to steal wire, such as the wire joining PV panels together, to recycle the wire for its inherent value in the conductive metals contained therein, or to repurpose the wire in other ways.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

A PV panel wire cover assembly includes an elongate wire cover and a plate coupler, the assembly used with a PV panel having perimeter trim with a leg spaced apart from the PV panel to define a gap therebetween. The leg of the perimeter trim has a perimeter trim thickness. The wire cover has first and second opposite sides and a first flange extending from the first side with a slot formed therein. The plate coupler includes a fastener and a plate having proximal portion and a distal portion, the distal portion sized for receipt within the gap. The fastener passes through the slot and has first and second portions engaging the first flange and the proximal portion of the plate respectively. The wire cover can be fastened to the perimeter trim of the PV panel through the plate coupler without penetrating the PV panel.

Other features, aspects and advantages of technology disclosed can be seen on review the drawings, the detailed description, and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DESCRIPTION OF THE INVENTION

To protect the wires and to hide them from view, it is desirable to provide a cover for the runs of wire which join PV panels together. Such covers would both protect the wires and make the wires less enticing to thieves, and present some degree of impediment to thieves interested in stealing the wires. While a basic cover could be provided over runs of wire joining panels together including a cover element and with a flange having a hole therein which can receive a fastener, a significant problem is encountered in that the flange of such a basic cover requires a hole in the panel through which a fastener can pass for connecting the cover to a panel. PV panels are typically substantially free of fastener holes thereon, other than fastener holes which are already dedicated to other purposes, including panel mounting purposes. Without a hole available for securing such a cover to the panel, one is left with the undesirable prospect of perhaps drilling an additional hole in the panel (which may void its warranty), which not only has significant propensity to damage the panel, it involves significant additional work. Accordingly, a need exists for a system for a wire-covering system for an array of photovoltaic panel which does not require drilling of holes into the panels, but can still allow for a wire cover to be mounted to the panels in a simple manner.

Figure 1:
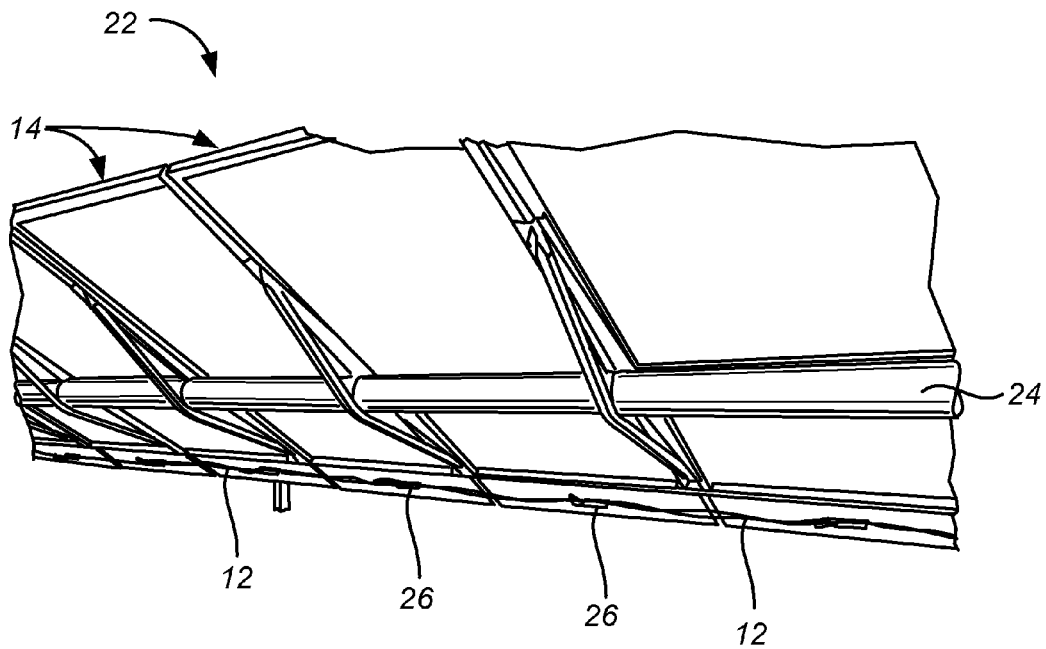
FIG. 1 is a rear perspective view of a conventional array of PV panels mounted to a common tracking bar.

FIG. 1 is a rear perspective view of a conventional array 22 of PV panels 14 mounted to a common tracking bar 24. A junction box 26 is seen mounted along an edge of each PV panel 14 with exposed wires 12 extending from the junction boxes.

Figure 2:
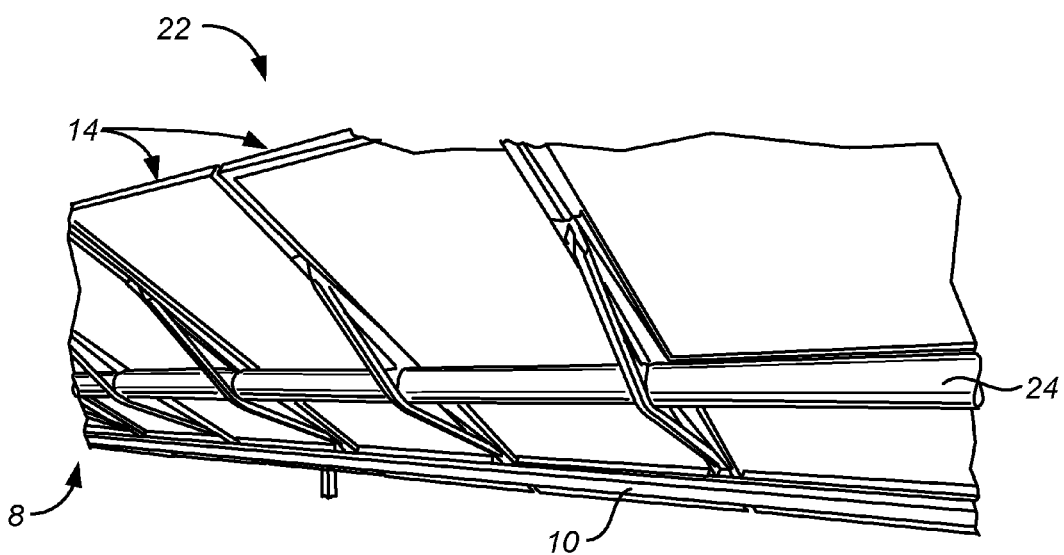
FIG. 2 is a rear perspective view of an array of PV panel wire cover assembly used with an array of PV panels mount to a common tracking bar.

With this technology, a PV panel wire cover assembly 8, see FIG. 2, includes a wire cover 10, also referred to as cover 10, for covering wires 12 which join photovoltaic (PV) panels 14 together so that they cannot be seen and to help protect the wires from the weather, vandalism, theft and animals. PV panels 14 are also referred to as panels 14 or solar panels 14. Assembly 8 also includes a clip 16 which can be easily attached to a panel 14 without requiring drilling of holes thereinto, and which clip 16 presents a hole 18 to which a fastener 20, such as a screw or bolt, can join after having interfaced with a wire cover 10, so that between the wire cover 10 and a series of such clips 16, the wire cover 10 can be coupled to the panels in a manner overlying the wires thereof.

Figure 3:
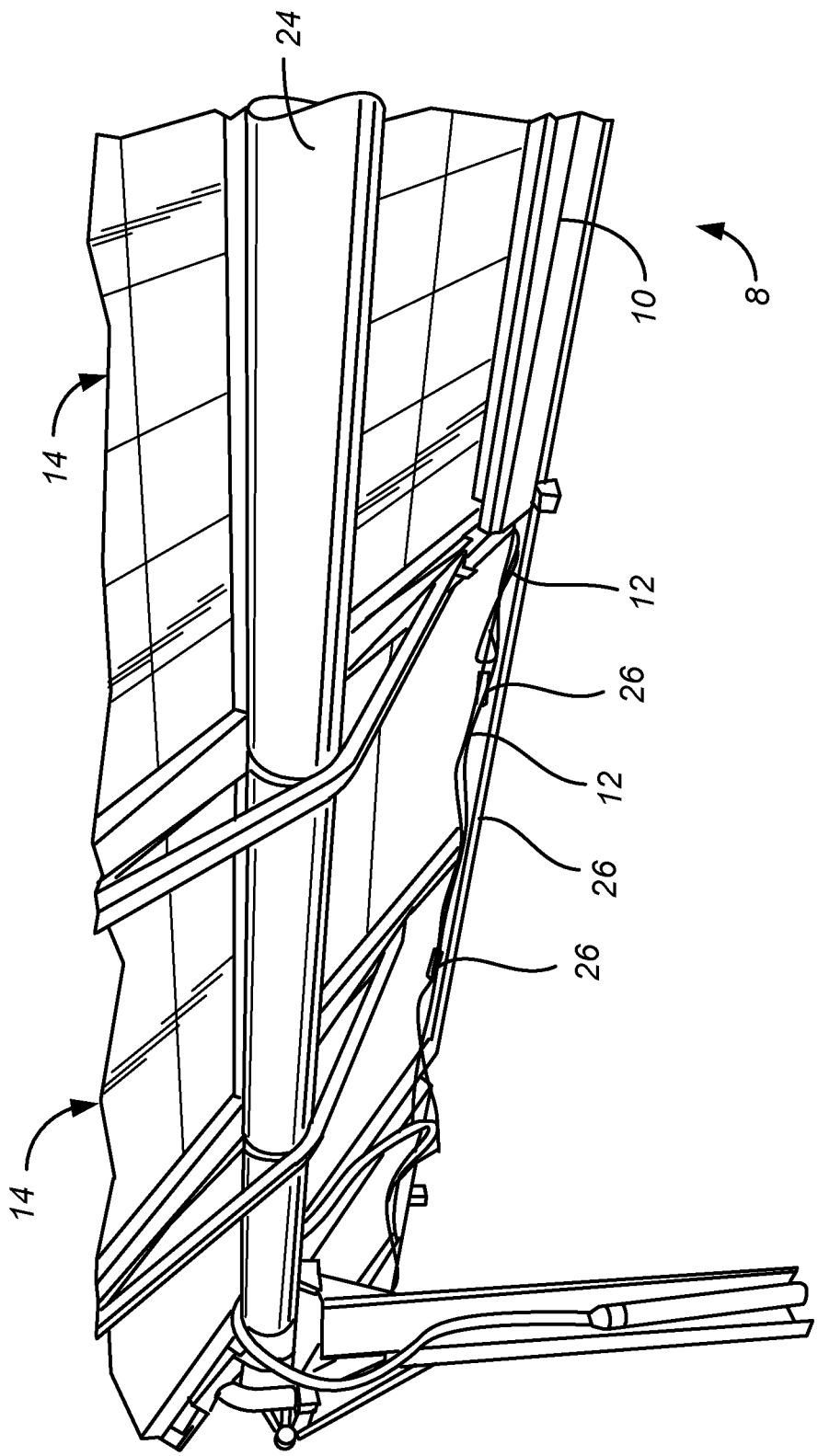
FIG. 3 is a view similar to that of FIG. 2 during the installation of wire covers to the array of PV panels, showing wires covered by a wire cover and wires to be covered by a subsequently installed wire cover.

FIG. 3 shows a wire cover 10 during installation with wires 12 extending from the open end of a wire cover 10 prior to installation of the next wire cover 10. FIGS. 8-11 illustrate how the wire cover 10 has a pair of flanges 28, 30 and a wire-covering housing 32 defining a housing interior 34 between the flanges. Wire-covering housing 32 is sized, in particular to have sufficient depth 36, to accommodate the wires 12 bundled therein. The flanges 28, 30 include slots. These slots are preferably of a variety which is elongate in form with rounded ends and with a length thereof parallel with a length of the wire-covering housing 32 of the wire cover 10. Such slots are provided on each flange 28, 30 directly adjacent to this wire-covering housing 32. Because the panel-to-panel spacing 46 between solar panels 14 in array 22 can vary slightly, slots 38, 40 are provided rather than a single hole, to accommodate some variation in panel-to-panel spacing. Longer flange 28 includes a notch 42 at each end. Notch 42 is useful in placing cover 10 under the edge of the PV panel frame thus reducing the need for clips and speeding up installation. However, for some types of equipment notch 42 can be omitted to create a notch less wire cover 10 indicated by the dashed lines 44 in FIG. 8.

Figure 4:
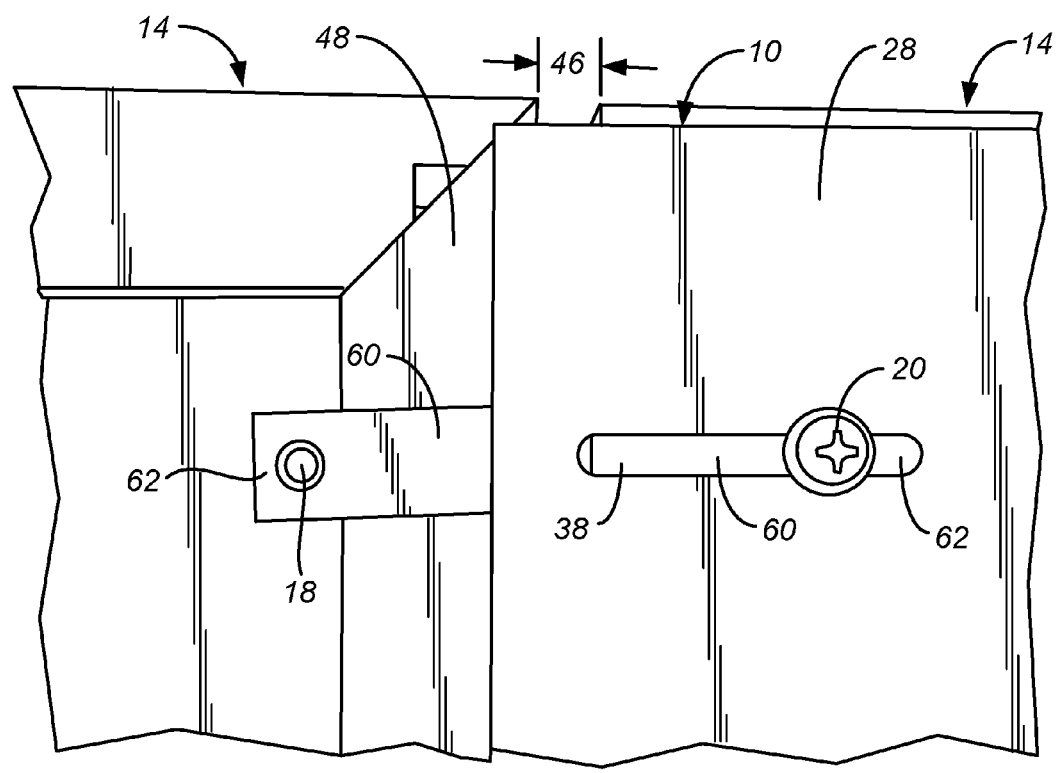
FIG. 4 is an enlarged view of a portion of the structure of FIG. 3 showing clips engaging trim pieces at opposed edges of adjacent PV panels.
Figure 5:
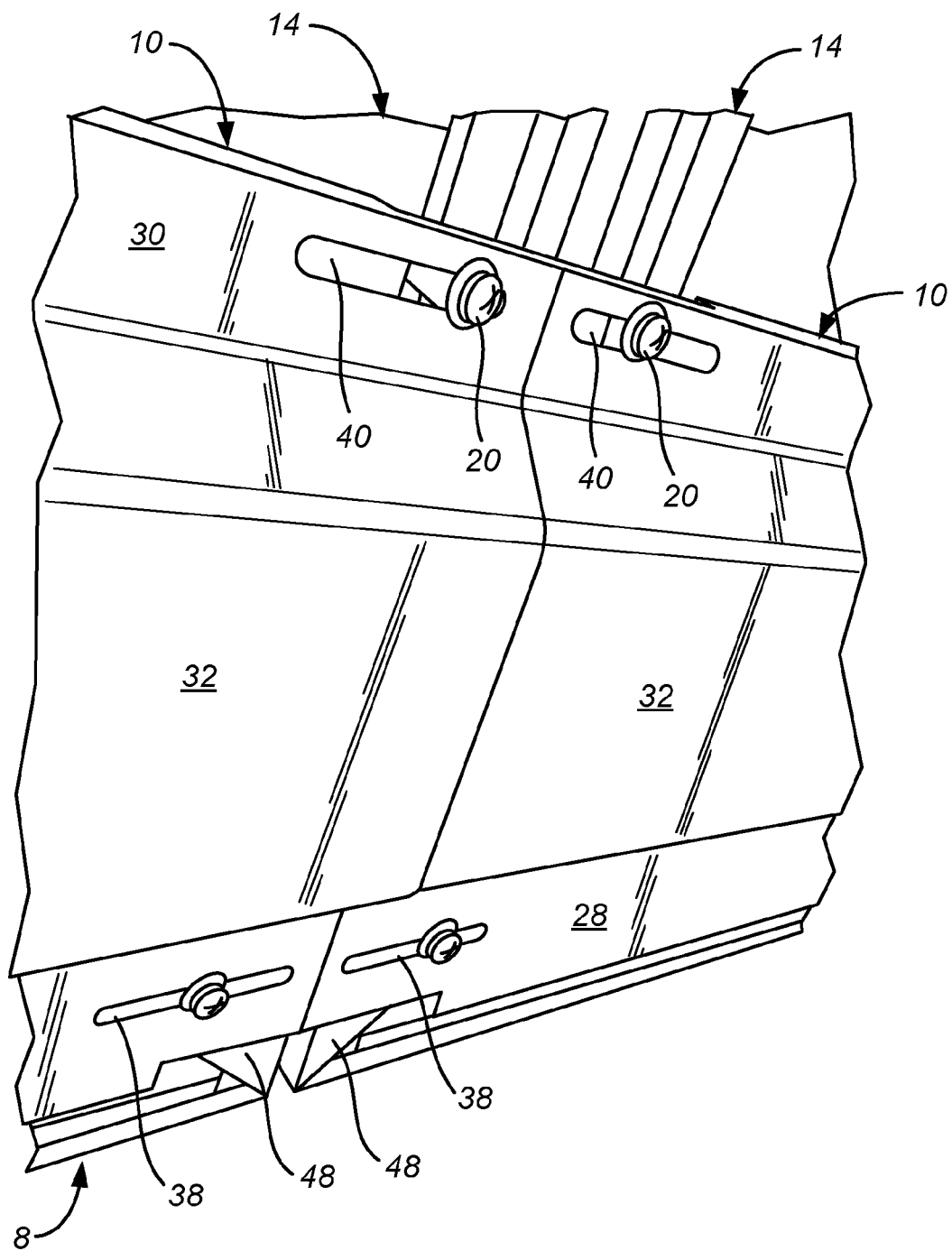
FIG. 5 is an enlarged perspective view a portion of the structure of FIG. 2 showing an end of one wire cover overlapping the end of an adjacent wire cover.
Figure 12:
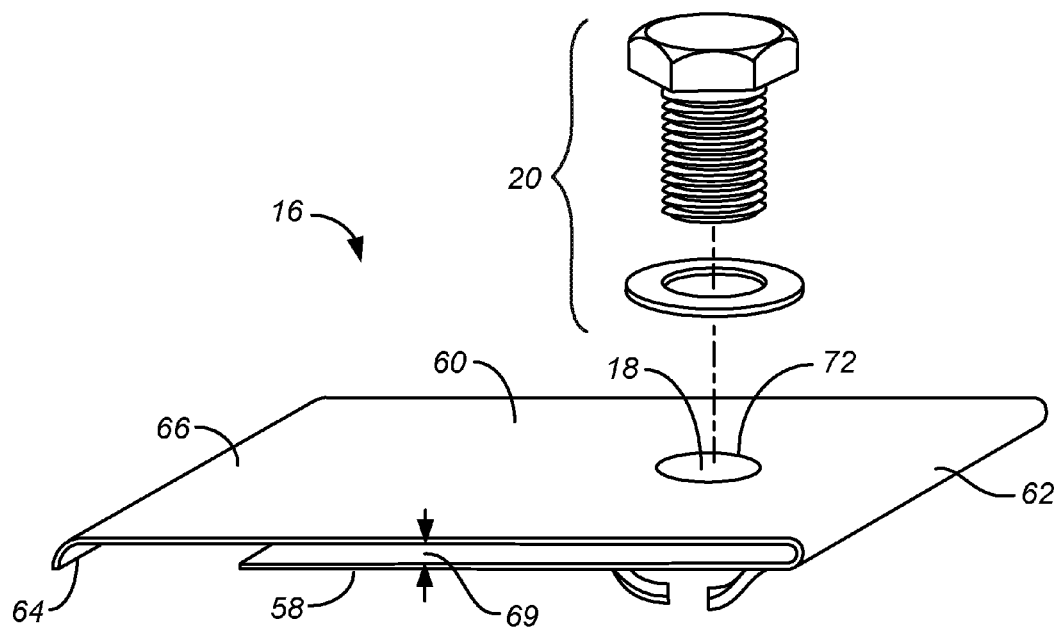
FIG. 12 is a top, front, right side view of a clip partially shown in FIG. 4 together with a fastener.
Figure 13:
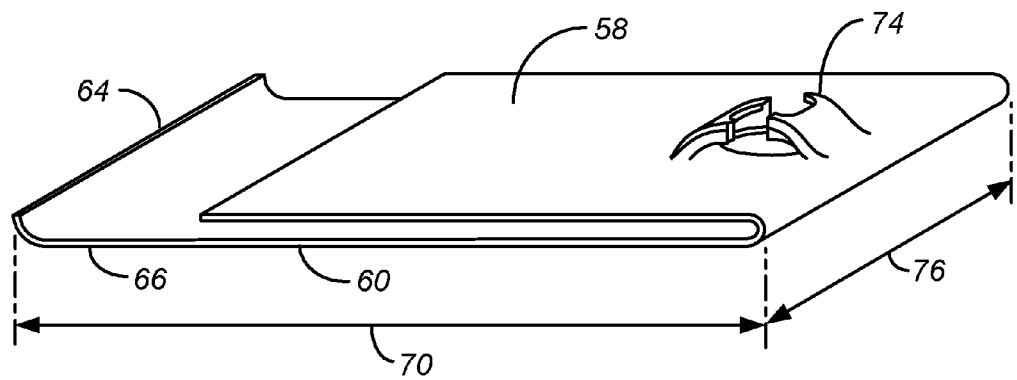
FIG. 13 is a bottom, front, right side view of the clip of FIG. 12.

Details of the clips 16 are shown in FIGS. 12 and 13, as well as FIG. 4 Each clip 16 can be a bent piece of spring steel (or optionally other material) which fits over a piece of trim 48 along the lateral sides 50 of the PV panels 14; see FIGS. 2-5. Trim 48 extends generally perpendicular to the side-to-side orientation of wires 12 and wire covers 10. Trim 48 is offset a distance slightly from a rear surface 54 of the panel with a width a distance sufficient to allow a short leg 58 of the clip 16 to reside therein. The clip 16 has a long leg 60 opposite the short leg 58 with the two legs substantially parallel to each other and joined together at a proximal end 62 of the clip. The long leg 60 ends at a trim engagement element 64, also called a tooth 64, at a distal end 66 thereof which can wrap around and grip somewhat an outer edge 68 of the trim 48. The proximal ends of each leg of the clip 16 are joined together so that the clip 16 is, in this example, a continuous piece of metal. A spacing or gap 69 between the legs 58, 60 of the clip 16 is preferably similar to a thickness of the trim 48 on the panel 14, so that somewhat of a friction fit is provided when the clip 16 is slid over the trim 48 with the trim 48 between the legs 58, 60.

Figure 20:
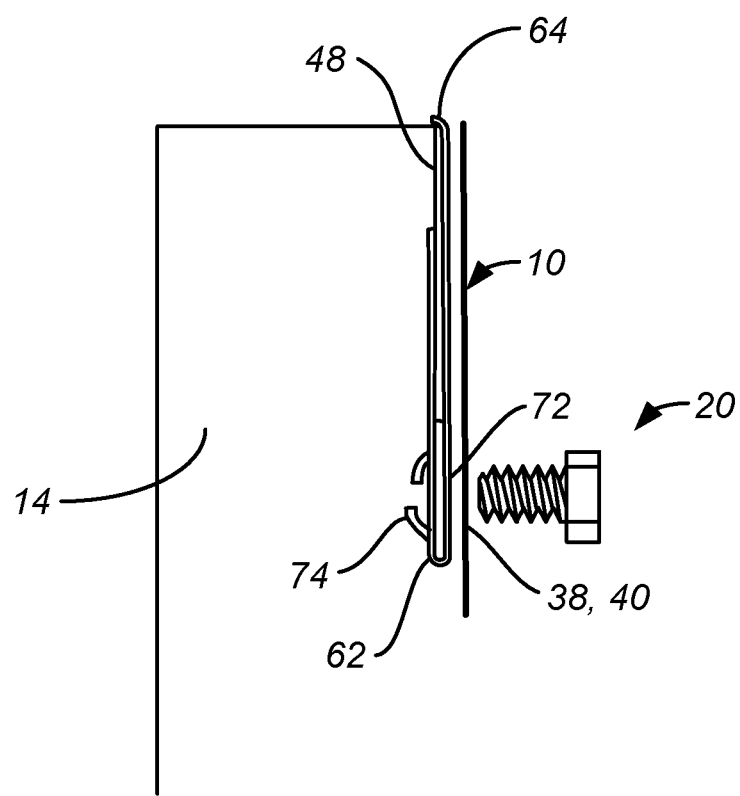
FIG. 20 is a simplified edge view showing a clip mounted to a trim piece of the solar panel with a flange of the wire cover about to be secured to the clip by a fastener.

FIG. 20 is a simplified edge view showing a clip 16 mounted to a trim piece 48 of the solar panel 14 with a flange 28, 30 of the wire cover 10 about to be secured to the clip by a fastener 20. An overall width of the clip 16 between the distal tooth 64 at the tip of the long leg 60 and a curve at the proximal end 62 where the long leg 60 and short leg 58 are joined together, see dimension 70 in FIG. 13, is greater than the width 56 of the trim 48 by an amount sufficient so that hole 18, which in this example includes a top through-hole 72 and a bottom threaded hole 74, passing through the clip 16 can be positioned off of the trim 48. See FIGS. 13 and 20. These holes 72, 74 pass through both the long leg 60 and the short leg 58 of the clip 16 with the holes adjacent to the curving proximal end 62 of the clip 16 which joins the long leg 60 and the short leg 58 together. The holes preferably are similar in size and aligned together, but, in this example, with the hole 74 in the short leg 58 being threaded and the hole 72 in the long leg 60 being a through hole and not threaded. It is also conceivable that both of the holes could be threaded or neither of the holes could be threaded and still function according to this technology if, for example, using non-threaded fasteners or if a threaded fastener pair such as a bolt and nut are used together. Most preferably, however, the short leg 58 has its hole 74 threaded and the long leg 60 does not have its hole 72 threaded.

In one embodiment, if the trim 48 has a one inch width 56, the long leg 60 could have a two inch length and the short leg 58 could have a one and a half inch length. In such a configuration a quarter inch hole could be provided which is spaced approximately a quarter inch to a half inch away from the curving proximal end 62 of the clip 16 where the long leg 60 and short leg 58 come together. The clip 16 could have various different widths 76; clip 16 is shown with approximately a three-quarter inch width in the embodiment depicted.

If the clip 16 is formed of materials other than spring steel (e.g., aluminum or plastic) it still preferably functions to clamp and hold to the trim 48. The clip 16 will then have a tendency to stay where initially placed. Furthermore, once a fastener 20 passes through the non-threaded hole 72 in the long leg 60 and then threads into the threads in the threaded hole 74 in the short leg 58, the long leg 60 and short leg 58 are drawn together and further pinch the clip 16 tightly against the trim 48. The clip 16 thus conveniently tends to stay where positioned before use, but can be repositioned fairly easily before it has been used, such as by sliding along the trim 48 with the tooth 64 at the distal end 66 of the long leg 60 keeping the clip 16 aligned where it is desired to be.

Once the clips 16 are positioned where desired, a wire cover 10 would be placed over wires 12 joining panels 14 together and with the elongate hole or slots 38, 40 in one of the flanges 28, 30 overlying the clip 16 and aligned with the holes in the clip 16. A fastener 20, such as a bolt, would then be passed through the elongate hole 38, 40 in the flange 28, 30 and then passed through the non-threaded hole 72 in the outer, long leg 60 of the clip 16, and then threaded into the threaded hole 74 in the short leg 58 of the clip 16. See FIG. 20. Once the fastener 20 has been tightened, not only has the clip 16 been secured in position against the trim 48 of the panel, but also the wire cover 10 has been secured to the panel as well. This process is repeated with additional clips 16 at corresponding locations on other portions of the wire covers 10 to securely cause the wire covers 10 to be mounted to overlie wires 12 joining the panels 14 together.

Figure 6:
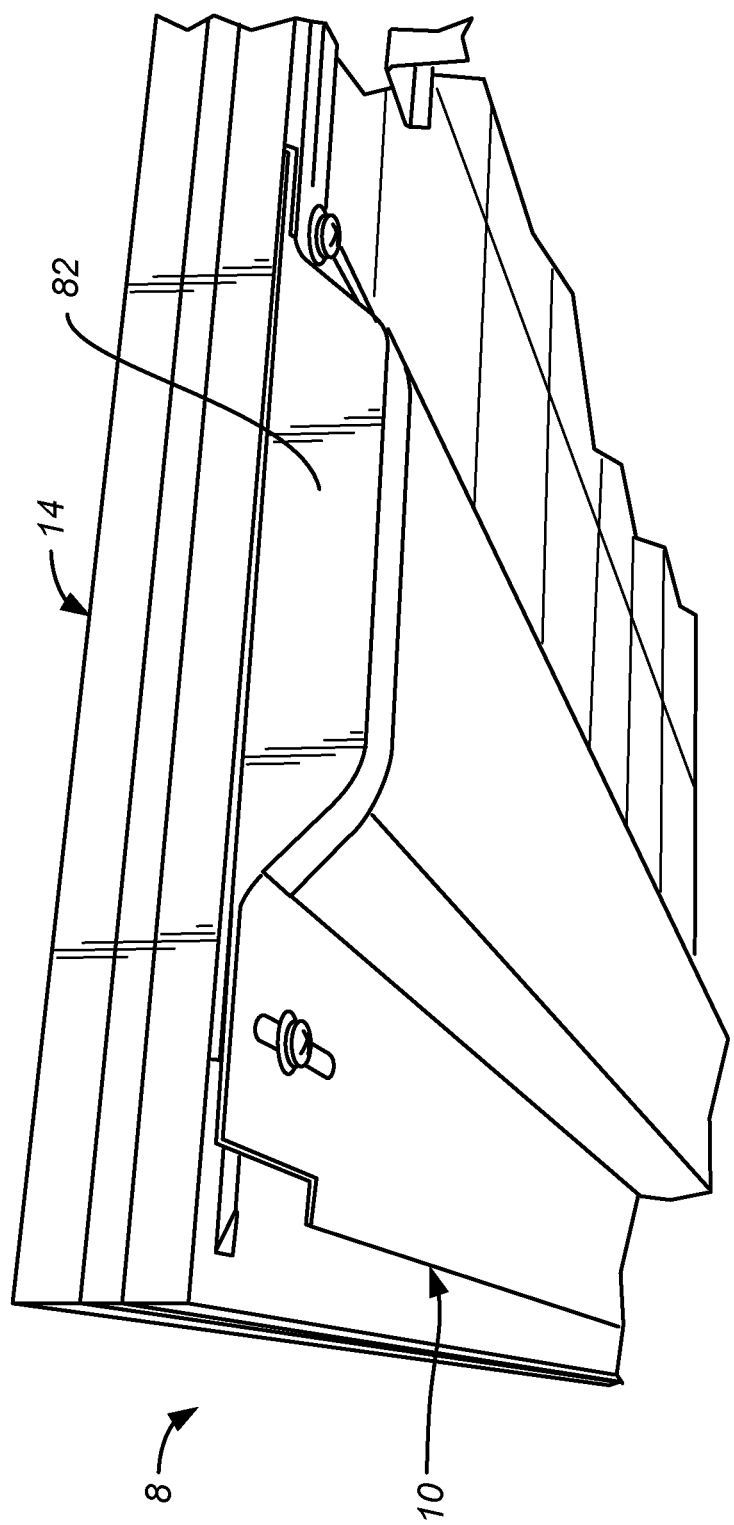
FIG. 6 shows an end cap covering the outermost end of the wire cover at the end of the array of photovoltaic panels.
Figure 7:
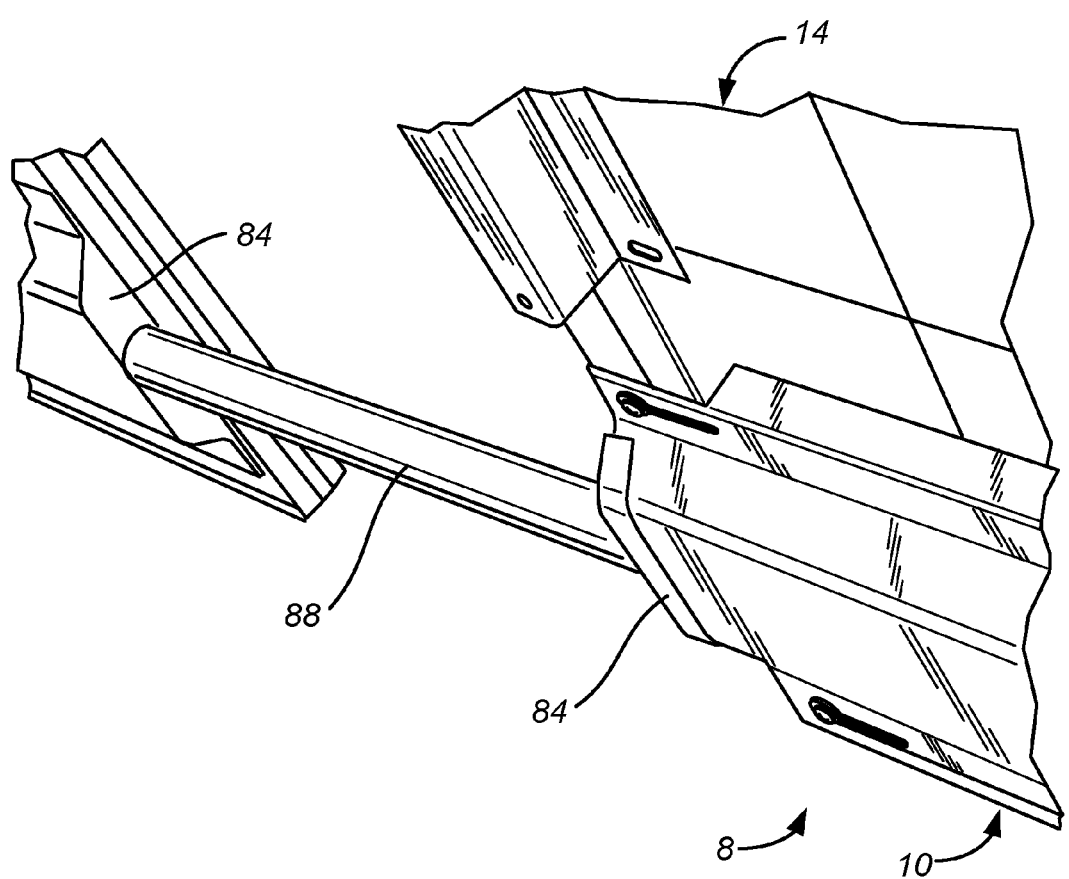
FIG. 7 shows a jumper tube extending between open end caps to protect wires passing between space-apart PV panels.
Figure 8:
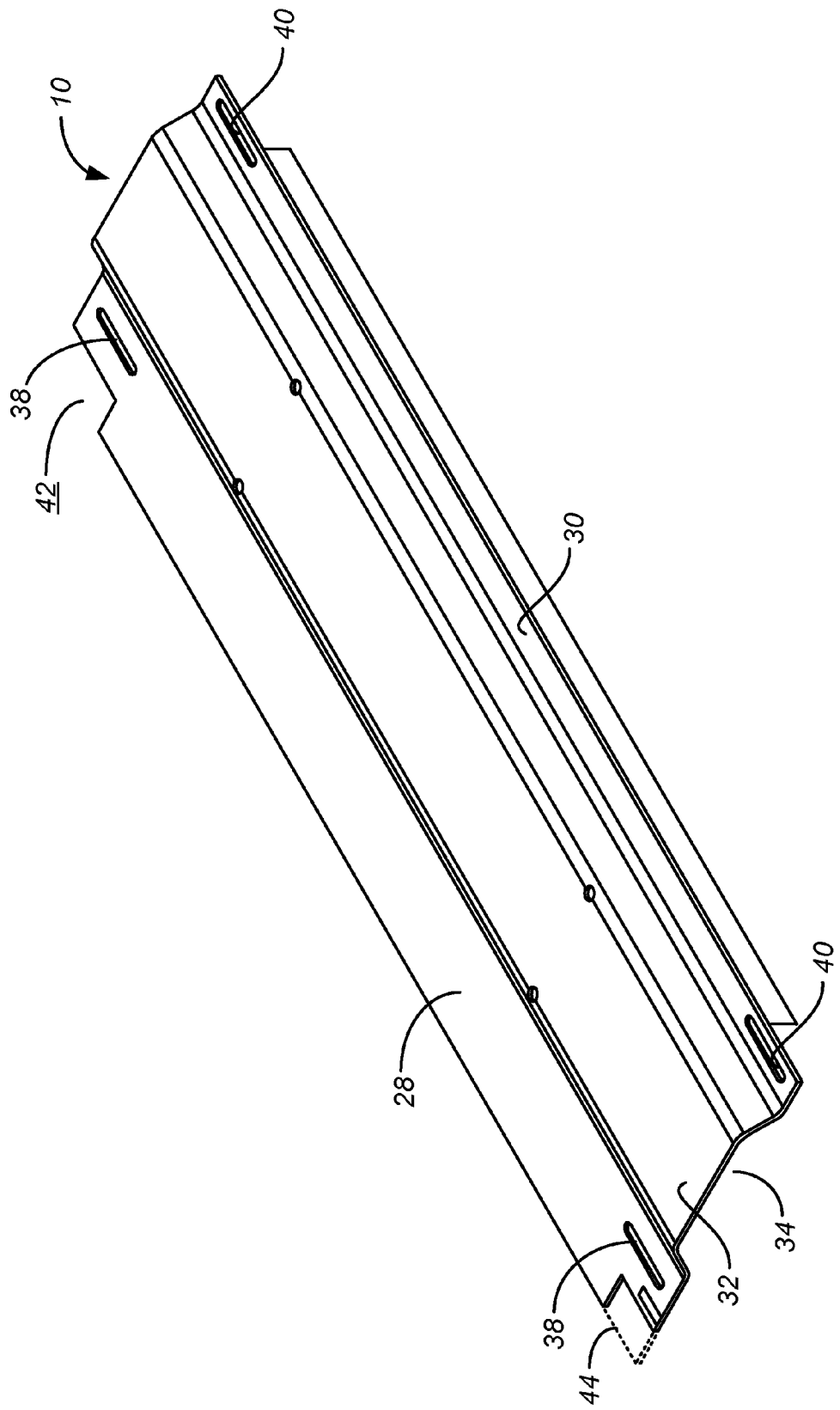
FIG. 8 is a top, front, right side isometric view of a wire cover.
Figure 9:
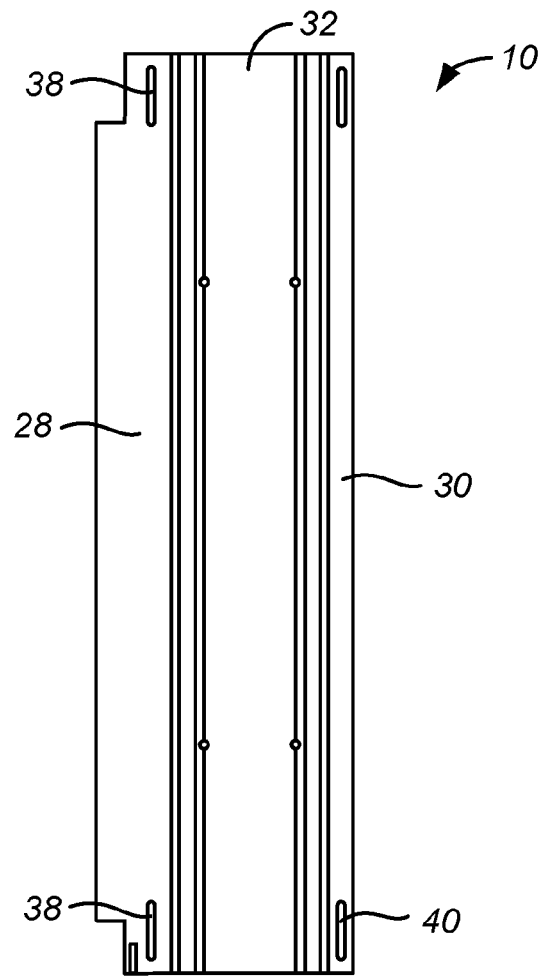
FIG. 9 is a top plan view of the wire cover of FIG. 8.
Figure 10:
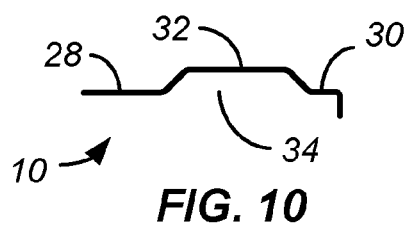
FIG. 10 is an end view of the wire cover of FIG. 8.
Figure 11:
FIG. 11 is a left side view of the wire cover of FIG. 8.
Figure 14:
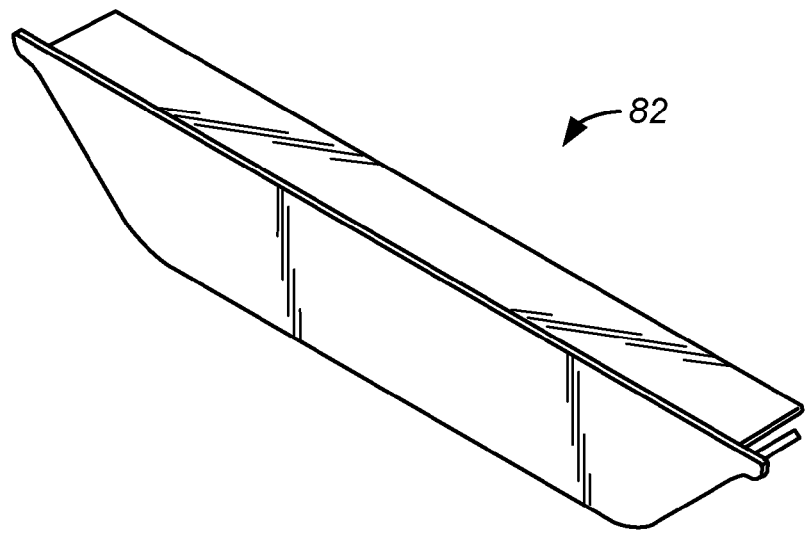
FIG. 14 is a front, top, right side view of the closed end cap shown in FIG. 6.
Figure 15:
FIG. 15 is a top plan view of the end cap of FIG. 14.
Figure 16:
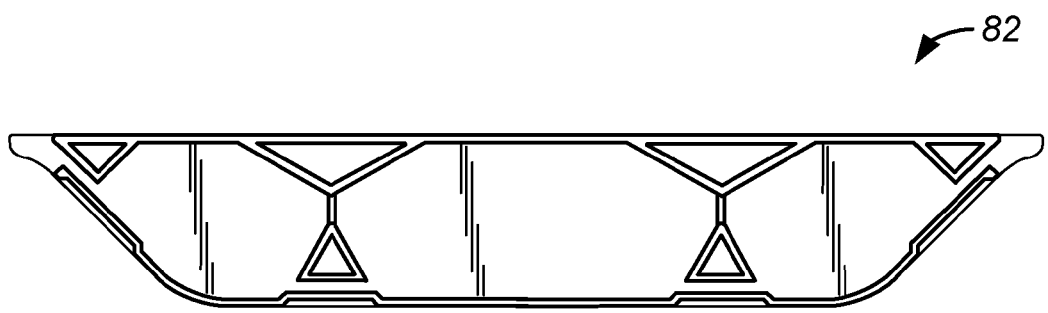
FIG. 16 is a rear elevation view of the end cap of FIG. 14.
Figure 17:
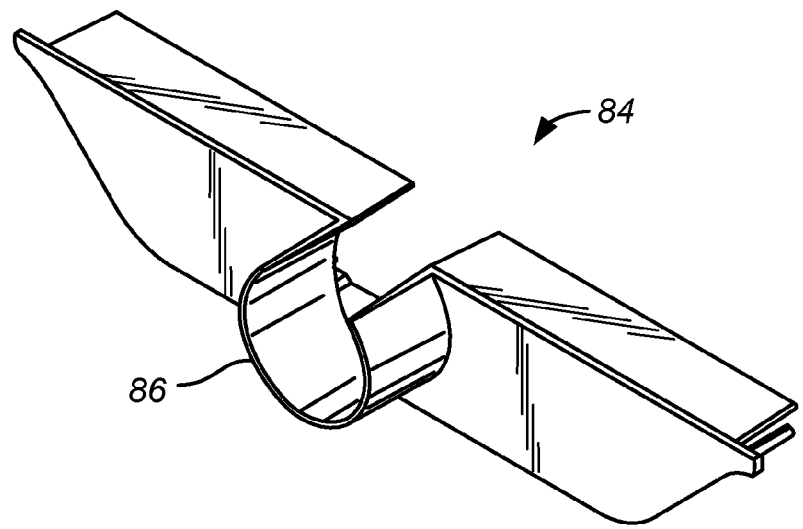
FIG. 17 is a front, top, right side view of the open end cap shown in FIG. 7.
Figure 18:
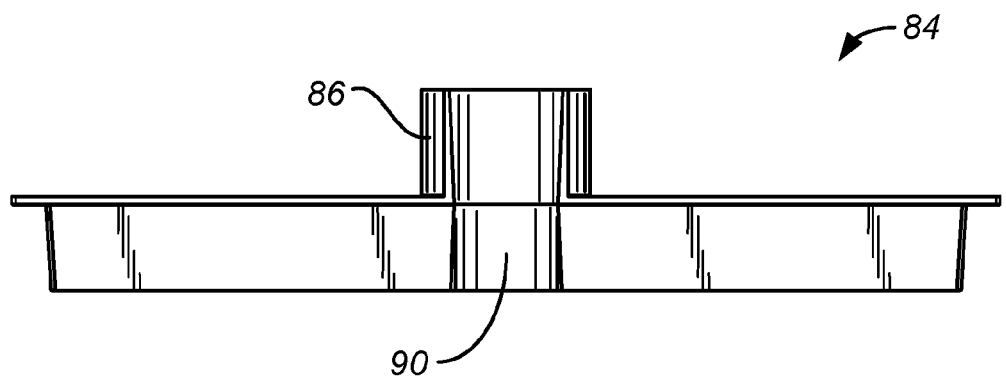
FIG. 18 is a top plan view of the end cap of FIG. 17.
Figure 19:
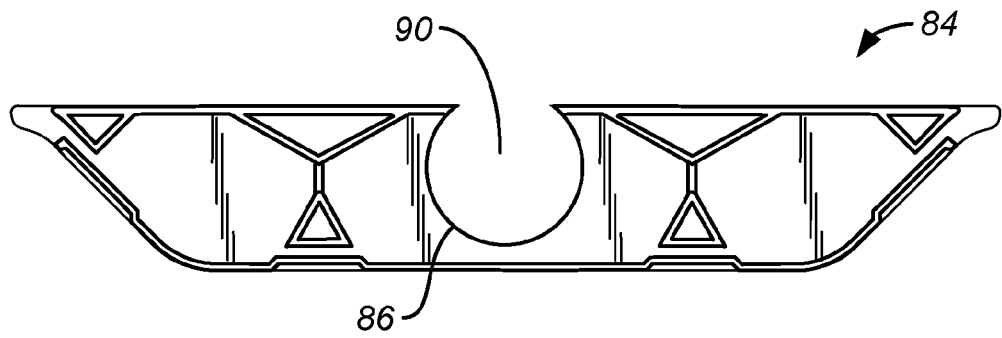
FIG. 19 is a rear elevation view of the end cap of FIG. 17.

FIG. 6 shows a closed end cap 82 covering the outermost end of the wire cover 10 at the end of the array 22 of photovoltaic panels 14. Details of end cap 82 are shown in FIGS. 14-16. FIGS. 7 and 17-19 illustrate an open end cap 84 secured to the outermost end of a wire cover 10. Open end caps 84 are used when there is a gap between PV panels 14, such as when there is a motor or other obstruction in the way on tracked arrays of PV panels. Open end cap 84 defines a wire passage opening 90 and has a curved extension 86 over which a jumper tube 88, see FIG. 7, is mounted. Wires 12 pass between the spaced-apart PV panels 14 along a wire passageway through wire passage opening 90, through curved extension 86 and through jumper tube 88. Use of closed end caps 82 and open end caps 84, together with jumper tube 88, helped to protect wires 12 from the elements, degradation or destruction by animals, and also helps to keep animals from entering housing interior 34. Jumper tube 88 can be made with somewhat flexible material, such as PVC or ABS, with a slit along its length to permit it to be placed over curved extensions 86 and the wires 12 extending between space-apart open end caps 84 as shown in FIG. 7. The length of jumper tube 88 is made to be slightly shorter than the distance between open end caps 84 so that it maintains contact with the curved extensions 86 of the open end caps.

If desired for further theft prevention, fasteners 20 having unique torque receiving surfaces can be used so that it is less likely that a thief has access to a proper tool for removal of such fasteners. The fasteners could be provided of a type which can allow for ready installation but does not allow for ready disassembly. For instance, rivets could be used instead of threaded fasteners or threaded fasteners with heads which allow for torque to be applied for fastening but not to be applied for removal. As a still further option, the fasteners could have heads which snap off after the fastener has been used, so that the torque applying head is removed and unavailable for theft access after installation.

Typically, wire covers 10 are provided which are of standard lengths which allow for convenient handling thereof, such as six foot lengths or ten foot lengths. The wire covers 10 can overlap each other somewhat at ends thereof to allow for continuous covering of the wires 12. Each wire cover 10 would typically have a length which spans two or more panels 14. The positions of the slotted holes 38, 40 are preferably selected to generally match widths 78 of the panels 14 but with the slotted holes sufficiently long to accommodate variations in panel size as well as spacing 46 between adjacent panels 14.

Covers 10 can be made of bent metal, such as galvanized sheet steel or of sheet aluminum. Covers 10 can also be made of polymer materials, such as PVC, typically through extrusion or molding techniques. While clips 16 are preferably made of materials such as spring steel to aid proper positioning; in some examples clips 16 may be made materials, such as layered materials, which may or may not exhibit the degree of resilience provided by spring steel. The covers 10 and clips 16 could alternatively be made of non-metal materials or metals of other varieties to optimize desired performance characteristics or to minimize expense or otherwise provide for benefits associated with particular materials selected.

In an alternative embodiment, see FIGS. 21-25, clip 16 is replaced with a plate coupling 94. Plate coupling 94 includes a plate 96 and a fastener 20. In a first embodiment the plate 96 is somewhat elongate with a distal portion 98, also referred to as distal plate 98, and a proximal portion 100, also referred to as proximal plate 100. The distal portion 98 and proximal portion 100 are, in this example, each planar and oriented parallel to each other. A bend portion 101 between the distal and proximal portions 98 and 100 offsets the distal plate 98 from the proximal plate 100. The proximal plate 100 includes a threaded hole 102 therein, preferably near a center of the proximal plate 100.

Trim 48 includes a first leg 104 extending away from rear surface 54 of PV panel 14 and a second leg 106 extending generally parallel to rear surface 54. The distal plate 98 and proximal plate 100 are parallel but offset by an offset distance 108 which is similar to of the thickness 107 of the second leg 106 of trim 48; in some examples offset distance 108 is about equal to or up to 10% less than thickness 107. In some examples plate 96 could engage the solar panel 14 itself or other structure associated with PV panel 14 to permit cover 10 to be secured to the PV panel. Also, in some examples the thickness 110 of the plate 96 is similar to the width 112 of the gap 114 between the second leg 106 of trim 48 and the rear surf ace 54 of the solar panel 14; in some examples thickness 110 is equal to 105% to 125% of width 112.

Figure 21:
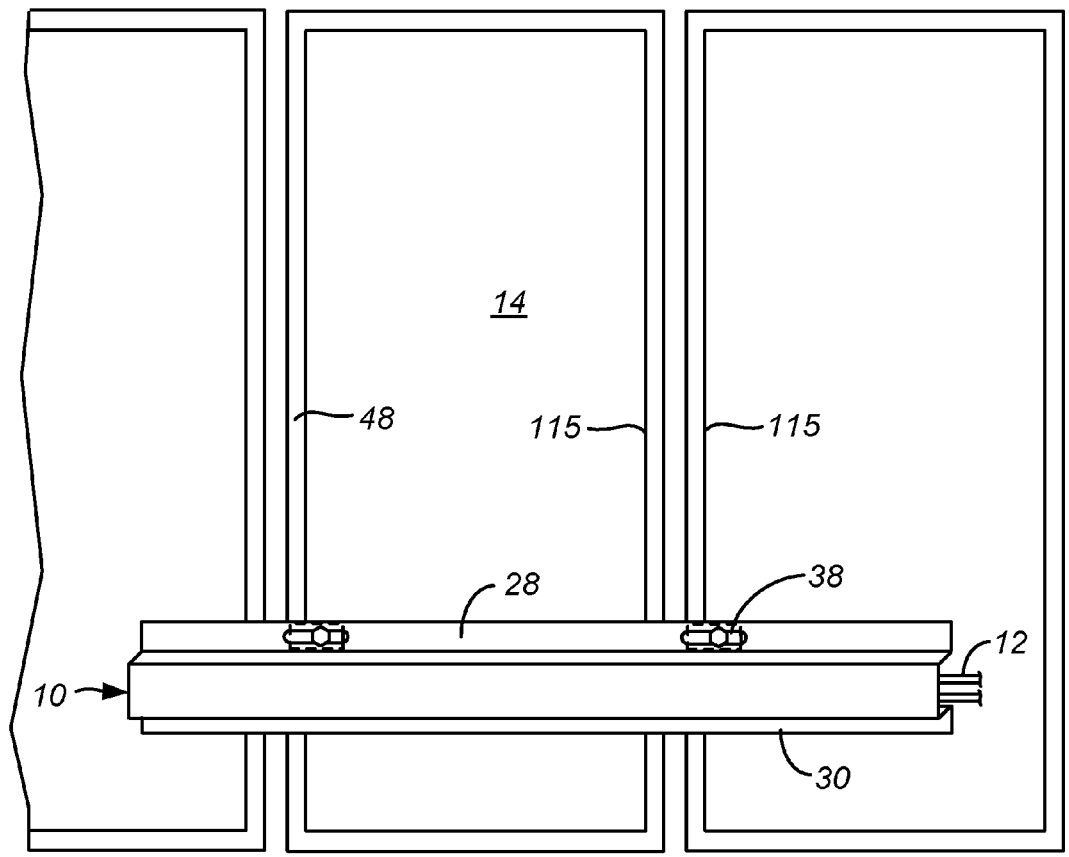
FIG. 21 is a simplified illustration of a series of PV panels directed to an alternative embodiment in which the wire cover is mounted to the panels using a plate coupling instead of a clip.
Figure 22:
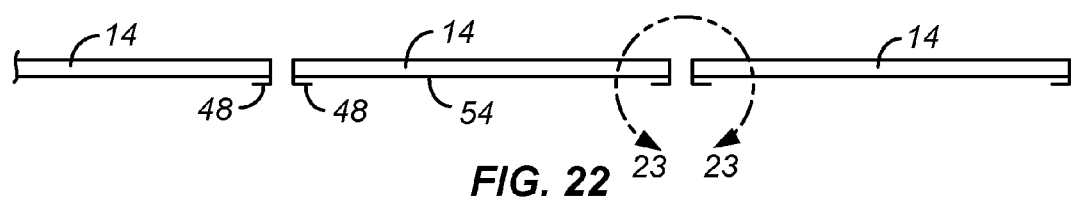
FIG. 22 is a simplified end view of several panels illustrating how the trim extends below the rear surface of the panels.
Figure 23:
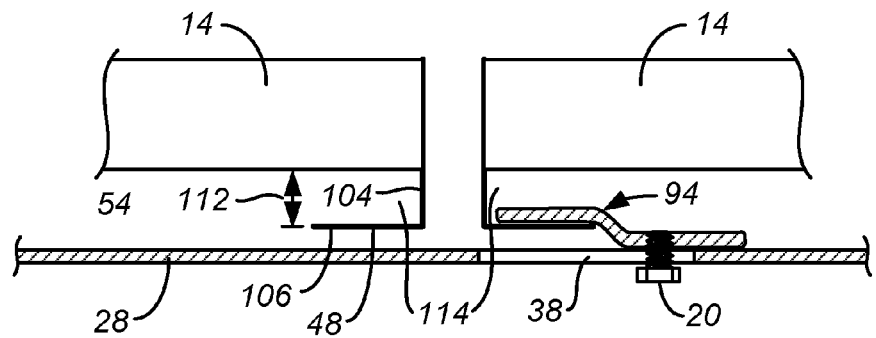
FIG. 23 is a simplified view illustrating securing a panel to a wire cover using the plate coupling.
Figure 24:
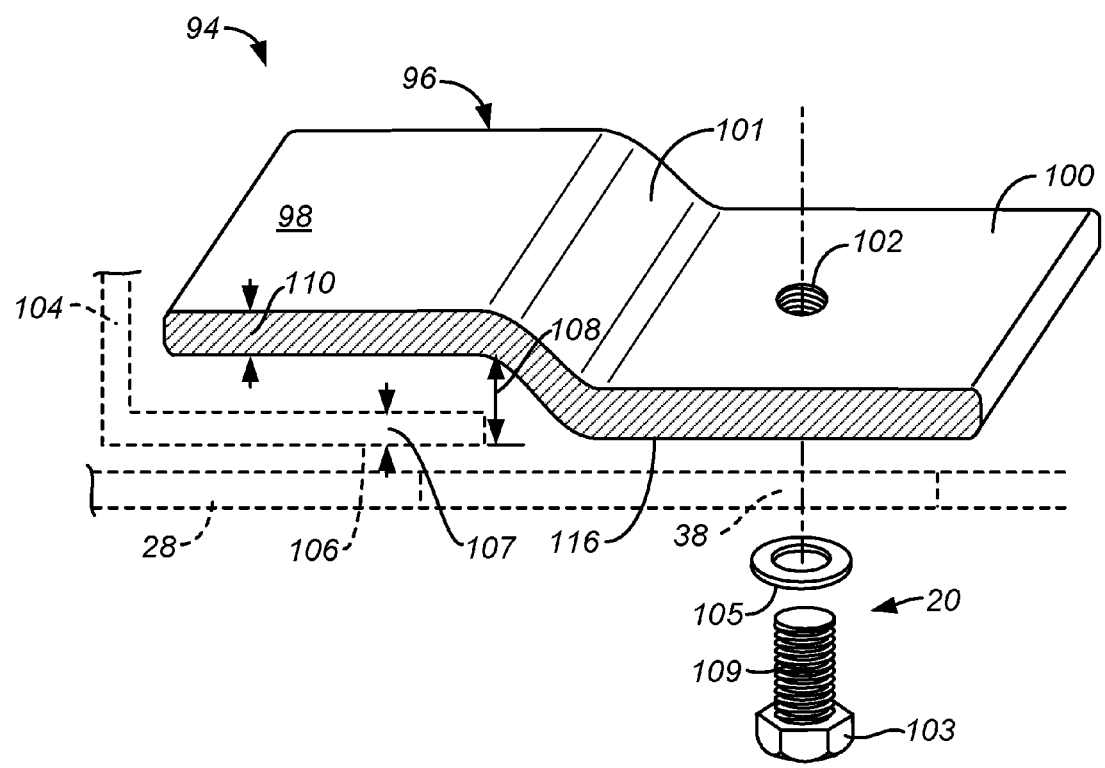
FIG. 24 is a simplified, somewhat exploded view illustrating a plate coupling, including a plate and a fastener, shown in solid lines with the trim of a PV panel and a flange of a wire cover shown in broken lines.
Figure 25:
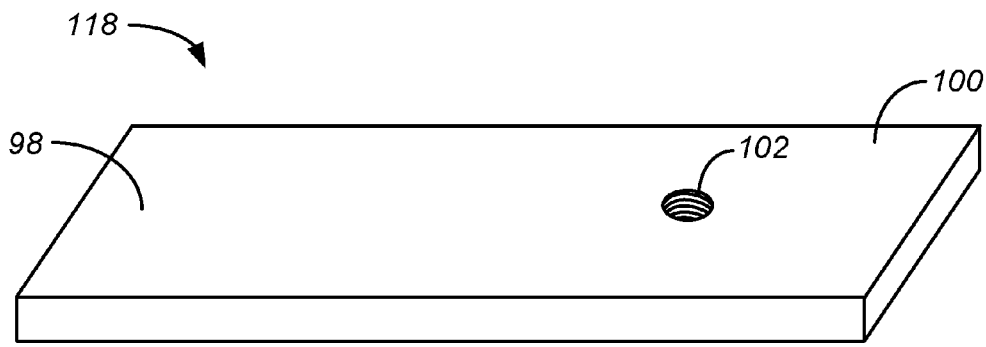
FIG. 25 shows an alternative embodiment of the plate of FIG. 24.

As shown in FIGS. 21 and 23, flange 28 has slots 38 extending generally perpendicular to the side edges 115 of PV panels 14. The slot 38 in flange 28 is aligned with the threaded hole 102 in the plate 96. Fastener 20 can be used by first passing through the slot 38 in the flange 28 of the cover 10 and then into the threaded hole 102 of the plate 96. Fastener 20 includes a bolt head 103 and a washer 105 acting as a first portion of the fastener and engaging flange 28. Fastener 20 has a threaded end 105 acting as a second portion engaging proximal portion 100 of plate 96. Tightening of the fastener 20 causes the plate 96 to be drawn toward the flange 28 of the cover 10. The cover 10 is positioned where desired spanning multiple panels 14 (or at least one panel 14) and with slots 38 in the flanges 28 adjacent to trim 48 at edges of the panels. In the example of FIGS. 21-23, slots are only shown in flange 28; slots could be formed in flange 30 and used with plates 96 and fasteners 20. The plate 96 is positioned so that the distal portion 98 is in the gap 114 and on a side of the second leg 106 of trim 48 opposite the flange 28 of the cover 10, so that the second leg 106 of the trim is positioned between the distal portion 98 of the plate 96 and the flange 28 of the cover 10. Then, when the fastener 20 is tightened, the second leg 106 of the trim 48 is captured between the distal portion 98 of the plate 96 and the flange 28 of the cover 10. The fastener 20 is tightened sufficiently so that the entire cover 10 is held to the panel 14 by the plate 96 and flange 28 sandwiching the second leg 106 of trim 48 therebetween. The provision of slots 38 through which fasteners 20 pass allows plate 96 to act as a sliding plate to accommodate a range of component sizes and locations and still provide for the secure mounting of cover 10 to a panel 14.

If desired, an undersurface 116 of distal portion 98, or of both distal portion 98 and proximal portion 100 of the plate 96, can be provided with a roughened or other high friction surface to further enhance the ability to engage with the trim 48 to hold the cover 10 tightly in place when the fastener 20 is tightened. The fastener is shown as a basic bolt which passes through the slot 38 in the flange 28 and then threads into the threads of the threaded hole 102. Other fastener arrangements, threaded or not threaded, could alternatively be provided. In one embodiment rather than having the threaded hole 102 on the proximal portion 100 of the plate 96, a threaded stud can extend downwardly (in FIGS. 23 and 24) and through the slot 38. A nut can then thread onto this threaded stud and as the nut is tightened, the plate is drawn tightly against the flange of the cover with the trim captured therebetween. This threaded stud could be integrally formed with the proximal portion of the plate, or a bolt could be provided passing through a hole (typically non-threaded) located where the threaded hole is shown. Alternatively, the bolt could pass through the threaded hole extending in a downward direction (with the orientation of FIGS. 23 and 24) and still have a nut fasten onto the bolt so that a bolt and nut pair are used along with a threaded hole or non-threaded hole to provide the compression force required to tighten the plate 96 toward the flange 28 of the cover 10 with the second leg 106 of the trim 48 captured therebetween.

As an alternative to the plate 96 shown with the bend therein, the plate could be flat. Such a flat plate 118, see FIG. 25, would still have a distal portion 98 and a proximal portion 100 and with the proximal portion typically including a hole (such as threaded hole 102) and/or a threaded stud associated therewith for fastening to the cover through the slots in the flange. The distal portion of such a flat plate would be in a common plane with the proximal portion and could have a plain structure. When the fastener is tightened, the flat plate is drawn toward the flange of the cover until the trim is tightly captured therebetween.

Typically, multiple such plates of either the bent or flat variety would be used at slots in a common flange (or opposite side flanges) of a cover and with the individual plates located behind different portions of trim of either the same or different panels. When these plates are tightened by the fasteners, different portions of trim are captured adjacent to the flange of the cover so that the cover is securely held in position relative to the panels.

The plates 96, 118 would typically be carried along with the cover 10, such as by being mounted to the cover, before installation to avoid having multiple separate parts. Such holding of the plates together with the slots in the flange of the cover could occur through having the fastener be a type of fastener which can be loosened or tightened but cannot be entirely separated away from the slots in the flange or entirely separated away from the plates. Rather, the fastener in the form of a bolt would have a capture structure on a tip thereof which would keep the fastener from being threaded entirely out of the threaded hole. Thus, the fastener can only go from loose to tight as it is rotated in different directions, but cannot be entirely removed in such an embodiment. One way of creating capture structure would be to deform the threads at the tip of the threaded end 109 of fastener 20 after the tip has passed completely through the threaded hole. The use of capture structure prevents the fastener from being inadvertently disconnected from the flange.

This disclosure is provided to reveal embodiments of the technology and best modes for practicing the technology. Having thus described the technology in this way, it should be apparent that various different modifications can be made to the preferred embodiment without departing from the scope and spirit of this disclosure. When structures are identified as a means to perform a function, the identification is intended to include all structures which can perform the function specified. One or more elements of one or more claims can be combined with elements of other claims. Any and all patents, patent applications and printed publications referred to above are incorporated by reference.

What is claimed is:

1. A PV panel wire cover assembly, for use with a PV panel having perimeter trim, the perimeter trim having a leg spaced apart from the PV panel to define a gap therebetween, the leg of the perimeter trim having a perimeter trim thickness, the PV panel wire cover assembly comprising:
  an elongate wire cover comprising first and second opposite sides and a first flange extending away from the first opposite side;
  the first flange having a slot formed therein;
  a plate coupler comprising a plate and a fastener;
  the plate comprising a proximal portion and a distal portion, the distal portion sized for receipt within the gap; and
  the fastener passing through the slot in the first flange and having a first portion engaging the first flange and a second portion engaging the proximal portion of the plate;
  whereby said wire cover can be fastened to the perimeter trim of the PV panel through said plate coupler without penetrating the PV panel.

2. The assembly according to claim 1, wherein the slot extends in a direction generally perpendicular to the first opposite side.

3. The assembly according to claim 1, wherein:
  the gap has a width; and the distal portion of the plate has a thickness equal to about 105%-125% of the width of the gap.

4. The assembly according to claim 1, wherein the fastener is a threaded fastener.

5. The assembly according to claim 1, wherein the fastener comprises capture structure to prevent the fastener from being inadvertently disconnected from the first flange.

6. The assembly according to claim 1, wherein the plate has a bend portion joining the distal portion and the proximal portion, the distal portion of the plate being generally parallel to but offset from the proximal portion of the plate by an offset distance.

7. The assembly according to claim 6, wherein the offset distance is equal to or up to 10% less than the perimeter trim thickness.

\* \* \* \* \*